(12) United States Patent
Martinez

(10) Patent No.: US 10,935,879 B2
(45) Date of Patent: Mar. 2, 2021

(54) SYSTEM FOR FORMING A FLOATING IMAGE

(71) Applicant: COMMISSARIAT A L'ENERGIE ATOMIQUE ET AUX ENERGIES ALTERNATIVES, Paris (FR)

(72) Inventor: Christophe Martinez, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/340,452

(22) PCT Filed: Oct. 10, 2017

(86) PCT No.: PCT/FR2017/052769
§ 371 (c)(1),
(2) Date: Apr. 9, 2019

(87) PCT Pub. No.: WO2018/069625
PCT Pub. Date: Apr. 19, 2018

(65) Prior Publication Data
US 2019/0235375 A1 Aug. 1, 2019

(30) Foreign Application Priority Data
Oct. 13, 2016 (FR) ...................................... 1659887

(51) Int. Cl.
*G03B 21/26* (2006.01)
*G03B 21/10* (2006.01)
(Continued)

(52) U.S. Cl.
CPC ............. *G03B 21/26* (2013.01); *G03B 21/10* (2013.01); *G03B 21/60* (2013.01); *G03B 21/62* (2013.01); *H04N 9/3141* (2013.01)

(58) Field of Classification Search
CPC ........ G03B 21/26; G03B 21/10; G03B 21/62; H04N 9/3141
See application file for complete search history.

(56) References Cited

U.S. PATENT DOCUMENTS

| 3,551,043 A | 12/1970 | Neuberger et al. |
| 2006/0055887 A1* | 3/2006 | Hoshino ................ G02B 30/54 353/7 |

(Continued)

FOREIGN PATENT DOCUMENTS

| WO | WO 2015/158999 A1 | 10/2015 |
| WO | WO 2015/162235 A2 | 10/2015 |
| WO | WO 2018/069625 A1 | 4/2018 |

OTHER PUBLICATIONS

International Search Report dated Jan. 23, 2018, in PCT/FR2017/052769 filed on Oct. 10, 2017.
(Continued)

*Primary Examiner* — Michelle M Iacoletti
*Assistant Examiner* — Danell L Owens
(74) *Attorney, Agent, or Firm* — Oblon, McClelland, Maier & Neustadt, L.L.P.

(57) ABSTRACT

The invention relates to a system for forming a floating image, including: at least one image projector, a display screen including transparent segments and scattering segments, and a semi-reflective structure placed between the image projector and the display screen, including a face, termed the transmission face, suitable for transmitting light beams coming from the image projector and light beams coming from the scene to be observed, and an opposite face, termed the reflection face, suitable for reflecting light beams coming from the display screen, so as to form a virtual image, termed the floating image, of the image projected onto the display screen.

20 Claims, 7 Drawing Sheets

(51) Int. Cl.
*G03B 21/62* (2014.01)
*G03B 21/60* (2014.01)
*H04N 9/31* (2006.01)

(56) References Cited

U.S. PATENT DOCUMENTS

2009/0009862 A1    1/2009  Hong
2016/0124295 A1*   5/2016  Montgomery ......... G02B 13/16
                                                            353/10
2017/0038585 A1    2/2017  Martinez et al.

OTHER PUBLICATIONS

Burbridge, C. et al., "Omnidirectional Projections with a Cone Mirror and Single Mirror Stereo", The 8th Workshop on Omnidirectional Vision, Camera Networks and Non-classical Cameras—OMNIVIS, Oct. 2008, Marseille, France. HAL Id: inria-00325394, total 12 pages.

* cited by examiner

SYSTEM FOR FORMING A FLOATING IMAGE

TECHNICAL FIELD

The field of the invention is that of systems for forming what is called a floating image, i.e. an image that appears in superposition on a scene.

PRIOR ART

Systems for forming floating images have existed in the entertainment field since the XIXth century and are currently under development notably with a view to addressing the field of publicity and experiential PR. They are based on an optical-illusion effect, called Pepper's ghost, the principle of which will now be recalled with reference to FIG. 1A, which illustrates the floating-image-forming system described in document US 2009/0009862.

In this example, the system A1 comprises an image source A2, for example an emissive screen, here suitable for delivering a plurality of source images to its emission face A3, and a semi-reflective structure A4 having the shape of a polygonal-based pyramid positioned upside down with respect to the image source A2, i.e. its apex A is located facing the emissive face A3 of the image source A2. Thus, the semi-reflective faces A5 of the pyramid A4 are oriented toward the image source A2 and toward the environment of the system A1.

The image source A2 delivers a plurality of source images that are each positioned facing a semi-reflective face A5 of the pyramid A4. Thus, the light beams of each delivered image are partially reflected by the corresponding face A5 of the pyramid A4 in the direction of the environment. An observer placed in front of one of the faces A5 of the pyramid A4 then sees a virtual image of the image delivered by the image source A2, this virtual image being positioned in a virtual plane located in the interior of the pyramid A4. The semi-transparency of the pyramidal structure A4 allows an image to be formed in superposition on the scene, this giving the observer the impression of observing a floating image. Moreover, in this example, an observer who were to move around the system A1 would see various virtual images located in the interior of the pyramid A4, which would give the impression of observation of a three-dimensional floating image.

One drawback of this type of system A1 is that the semi-reflective structure A4 is necessarily oriented so that the semi-reflective faces A5 are oriented toward the image source A2 and toward the environment of the system A1. As a result, the field of view is limited on the one hand by the emission face A3 of the image source A2 and on the other hand by the base of the semi-reflective structure A4. In addition, the upside-down orientation of the pyramid A4 with respect to the image source A2 requires provision to be made for elements for holding the pyramid A4, this adding an unattractive effect to the system and decreasing the viewing comfort of the observer.

Document U.S. Pat. No. 3,551,043 describes a system A1 for projecting images onto a translucent display screen A6. As illustrated in FIG. 1B, the system A1 comprises a first projector A7a and a second projector A7b, which are each suitable for projecting a source image onto the same display screen. The projectors A7a, A7b comprise an image source and an optical projecting system. A semi-reflective structure A4 is positioned on the optical path running from the first projector A7a to the display screen A6, and on the optical path running from the second projector A7b to the display screen A6. It allows the light beams coming from the first projector A7a to be reflected in the direction of the screen A6, and the light beams coming from the second projector A7b to be transmitted in the direction of the screen A6. Thus, in operation, the image-forming system A1 ensures the display on the screen A6 of the image delivered by the first projector A7a, in superposition on the image delivered by the second projector A7b. An observer positioned on the opposite side of the display screen A6 is then able to view the two displayed images, one being superposed on the other.

One drawback of this system A1 is notably that the display screen A6 is translucent and not transparent, in order to prevent the observer from being able to clearly view the second projector A7b located behind the screen A6. Thus, this system A1 does not ensure the formation of a floating image, i.e. an image observable in superposition on a scene located behind the display screen.

SUMMARY OF THE INVENTION

The objective of the invention is to at least partially remedy the drawbacks of the prior art, and more particularly to provide a floating-image-forming system that ensures the viewing comfort of the observer of the floating image, while improving the visual experience of observation of a floating image in superposition on the scene. To this end, the subject of the invention is a system for forming a floating image, comprising at least one image projector, suitable for projecting a source image, and a display screen suitable for displaying the image projected by the image projector.

According to the invention, said display screen comprises transparent segments and scattering segments, and is furthermore suitable for partially transmitting incident light beams. The transparent segments are suitable for transmitting light beams incident on the internal face coming from a scene to be observed, and the scattering segments are suitable for scattering light beams incident on the internal face coming from the image projector and thus for displaying the projected image. Furthermore, the floating-image-forming system furthermore comprises a semi-reflective structure placed between the image projector and the display screen, comprising a face, termed the transmission face, suitable for transmitting light beams coming from the image projector and light beams coming from a scene to be observed, and an opposite face, termed the reflection face, suitable for reflecting light beams coming from the display screen, so as to form a virtual image, termed the floating image, of the image projected on the display screen, said floating image being observable through the display screen by means of the semi-reflective structure.

The following are certain preferred but nonlimiting aspects of this floating-image-forming system.

The scattering segments of said display screen may furthermore be reflective so that the light beams coming from the semi-reflective structure and scattered by the scattering segments are reflected in the direction of the semi-reflective structure.

The scattering segments of said display screen may furthermore be retroreflective so that the light beams coming from the semi-reflective structure with an axis of incidence with respect to the scattering segments are reflected by the scattering segments in the direction of the semi-reflective structure with an axis of reflection identical to the axis of incidence.

The display screen may comprise a plurality of display faces that are substantially planar and distinct pairwise, and the semi-reflective structure may also comprise a plurality of faces that are substantially planar and inclined pairwise, each being optically associated with one display face.

Said display faces and said faces of the semi-reflective structure may extend continuously about an axis, termed the reference axis, passing through a steering structure of said projector, the display screen and the semi-reflective structure each forming a pyramidal cone.

The projector may be suitable for delivering a plurality of source images, and may comprise at least one projecting optical system suitable for optically conjugating a source image with a different face of the display screen.

The projector may comprise a steering structure having a plurality of reflective faces, each of said steering reflective faces being optically associated with a source image and with a display face.

The projector may comprise a steering structure having a reflective face that is able to rotate about a reference axis so as to project a source image onto said faces of the display screen.

The scattering segments of said display faces may be:
retroreflective so that the light beams coming from the semi-reflective structure with an axis of incidence with respect to the scattering segments are reflected by the scattering segments in the direction of the semi-reflective structure with an axis of reflection identical to the axis of incidence, and
suitable for scattering the retroreflected light beams in a scattering cone, each scattering cone associated with one display face partially overlapping the scattering cone associated with an adjacent display face.

The display screen and the semi-reflective structure may each comprise a single substantially curved face.

Said curved faces of the display screen and of the semi-reflective structure may extend continuously about a reference axis passing through a steering structure of said projector, the display screen and the semi-reflective structure each forming a cone of revolution with respect to said reference axis.

The image delivered by the image source may be an anamorphic image.

The transparent segments of the display screen may be suitable for transmitting light beams coming from the semi-reflective structure, and the scattering segments may be suitable for scattering light beams coming from the semi-reflective structure in the direction of said semi-reflective structure.

Each scattering segment may be encircled by a transparent segment, and the display screen may have a degree of occultation by the scattering segments lower than or equal to 20%.

The image projector may comprise at least one steering structure suitable for reflecting at least partially the light beams coming from an image source in the direction of the display screen, said semi-reflective structure being placed between the display screen and the steering structure. The steering structure may be placed facing the internal face of the screen. The transmission face of the semi-reflective structure may be oriented toward the steering structure, and the reflection face be oriented toward the internal face of the screen.

BRIEF DESCRIPTION OF THE DRAWINGS

Other aspects, aims, advantages and features of the invention will become more clearly apparent on reading the following detailed description of preferred embodiments thereof, which description is given by way of nonlimiting example with reference to the appended drawings, in which.

DETAILED DESCRIPTION OF PARTICULAR EMBODIMENTS

In the figures and in the rest of the description, the same references have been used to reference elements that are identical or similar. In addition, the various elements are not shown to scale for the sake of the clarity of the figures. Moreover, the various embodiments and variants are not exclusive from one another and may be combined together. Unless otherwise indicated, the terms "substantially", "about", and "of the order of" mean to within 10%.

Generally, the floating-image-forming system comprises a projector of at least one source image, suitable for ensuring the projection of the source image onto a display screen. It furthermore comprises a display screen suitable for ensuring the display of the projected image and for allowing the observation of the scene located behind the screen. Thus, it comprises transparent segments and scattering segments that are distributed over all or some of its area. Preferably, as detailed below, the scattering segments are also reflective, or even retroreflective. The system also comprises a semi-reflective structure for forming the floating image, located between the projector and the display screen, and suitable for forming a virtual, termed the floating image, of the image displayed by the screen.

Figure 1A:
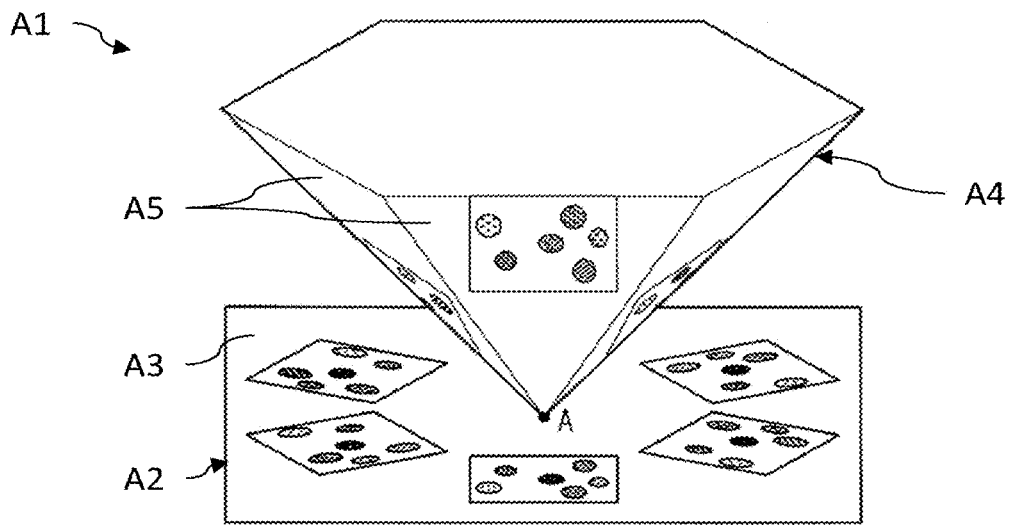
FIGS. 1A and 1B, which have already been described, illustrate two examples of image-forming systems, one for forming floating images (FIG. 1A) and one for forming non-floating images (FIG. 1B), according to the prior art.
Figure 1B:
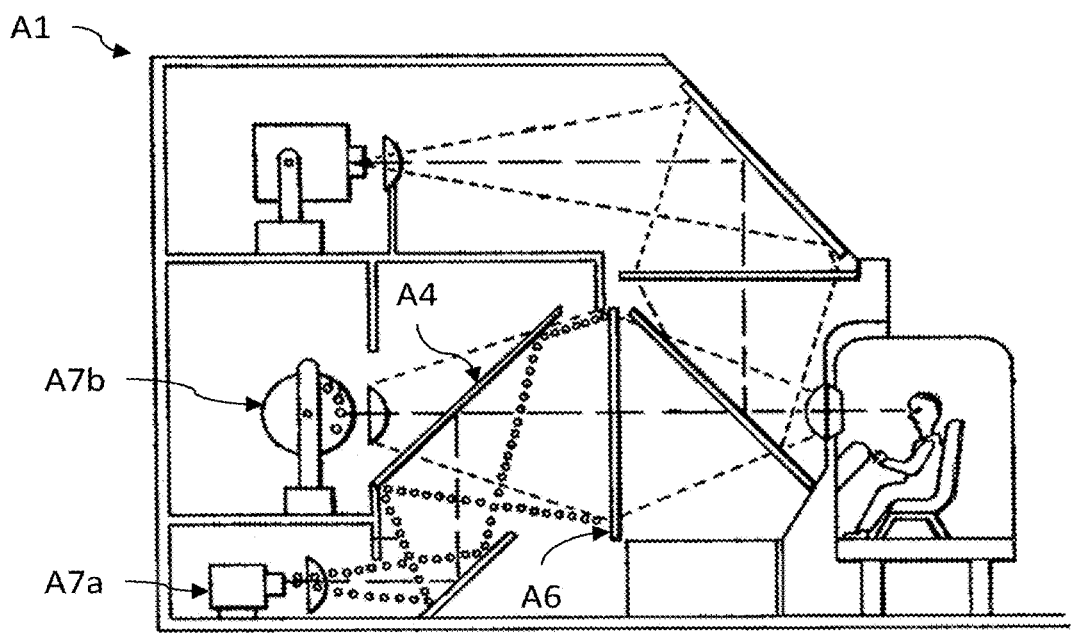
Figure 2:
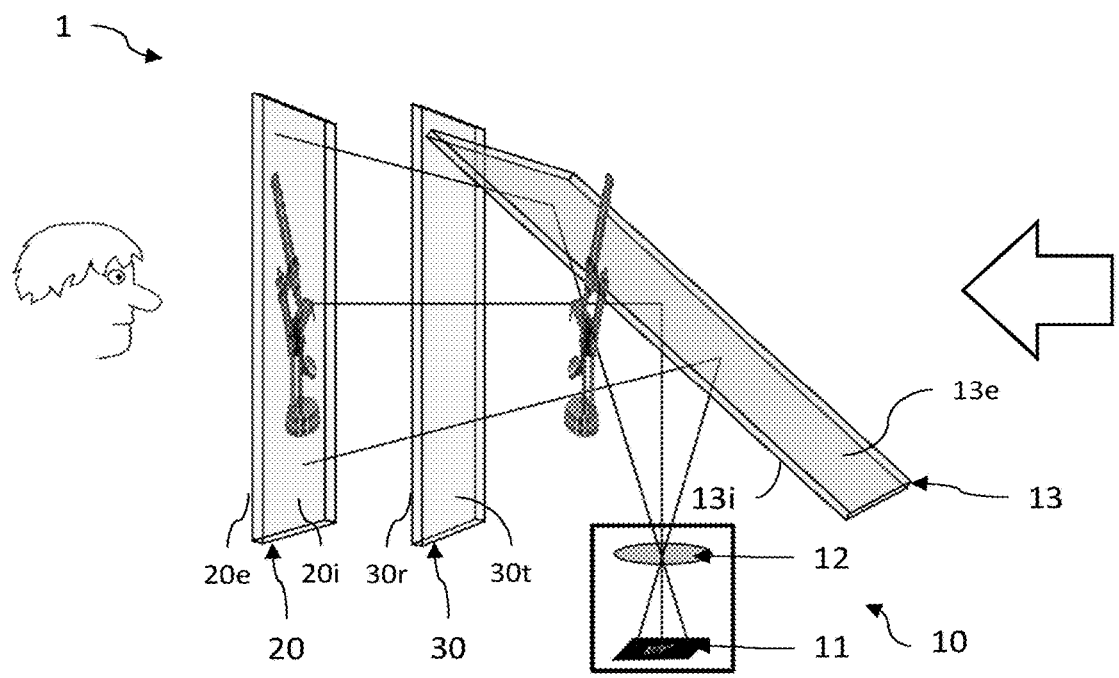
FIG. 2 illustrates, partially and schematically, an image-forming system according to one embodiment.

FIG. 2 schematically illustrates a system 1 for forming a floating image according to a first embodiment, in which the projector 10 comprises a steering semi-reflective plate 13.

The image projector 10 comprises at least one image source 11 and one associated projecting optical system 12, and, preferably, one steering structure 13. The image source 11, for example an emissive screen, is suitable for delivering at least one image to be displayed, termed the source image. It may be a question, inter alia, of a liquid-crystal display (LCD), of a light-emitting-diode (LED) display and optionally of an organic-light-emitting-diode (OLED) display, or even of a cathode-ray-tube (CRT) display. The image source 11 will advantageously consist of a digital micromirror device (DMD) associated with an RGB light source.

The projecting optical system 12 is suitable for projecting the image delivered by the image source 11 onto the display screen 20, i.e. to project, onto the screen 20, a real image of the delivered image. In other words, the projecting optical system 12 ensures the optical conjugation of the emission face of the image source 11 and of the display screen 20. It may thus for example comprise one or more lenses, and is placed between the image source 11 and the display screen 20, and in this example between the image source 11 and the steering structure 13.

The projector 10 comprises in this example a steering structure 13 suitable for at least partially or even completely reflecting the light beams coining from the image source 11 in the direction of the display screen 20. The steering structure 13 is here formed of a semi-reflective plate, placed on the optical path running from the projector 10 to the display screen 20, and here between the display screen 20 and the scene to be observed. The steering plate 13 comprises a semi-reflective face, termed the internal face 13*i*, which is turned toward the projector 10 and the display screen 20, and a face, termed the external face 13*e*, which is opposite to the internal face 13*i*. It may be oriented, as illustrated, so as to make an angle of inclination, for example 45°, to the display screen 20. The steering plate 13 may be replaced by an interference filter performing the same optical function as the semi-reflective plate, or even, as will be detailed below, by a mirror. In this example, the steering structure 13 has, in association with the display screen 20, a pyramid shape the base of which is located facing the projector 10.

Figures 3A, 3B, 3C, 3D:
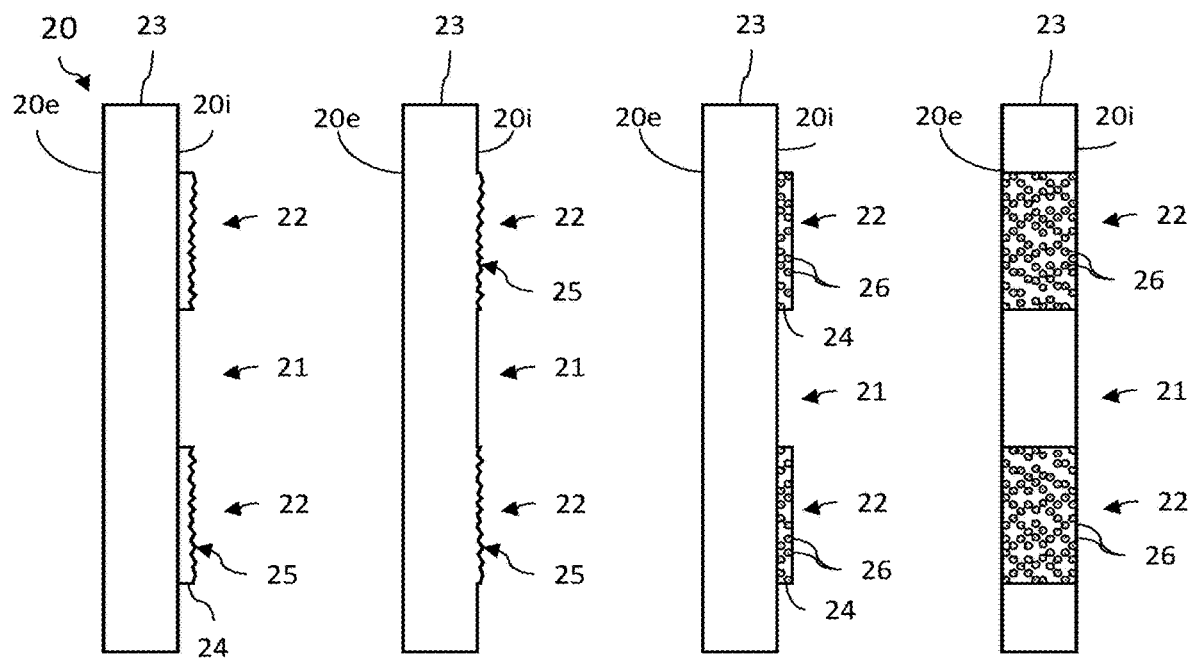
FIGS. 3A to 3D are partial and schematic cross-sectional views of various examples of a display screen comprising transparent segments and scattering segments.

The screen is a display screen 20 that is partially transparent and comprises, to this end, transparent segments 21 and scattering segments 22 that are distributed over all or some of its area (see FIG. 3A and the figures thereafter). It comprises a face, termed the internal face 20*i*, that is intended to receive the light beams coming from the projector 10, and an opposite face, termed the external face 20*e*, facing which an observer is positioned. The display screen 20 is thus suitable for scattering relatively strongly, via the scattering segments 22, one portion of the beams incident on its internal face 20*i*, in particular the beams coming from the projector 10. It is also suitable for transmitting, via the transparent segments 21, another portion of the beams incident on its internal face 20*i*, in particular the beams coming from the scene. To form a real image of the image delivered by the projector 10, the display screen 20 is placed in the image plane of the projecting optical system 12.

The transparent segments 21 and the scattering segments 22 are distinct from one another, and are preferably mutually arranged so that a scattering segment 22 is encircled, in the plane of the screen, by a transparent segment 21. By transparent, what is meant is the optical property of an element, material, surface, etc. that lets light pass and through which the scene located behind the element in question may be clearly distinguished. A transparent segment 21 thus differs from a translucent segment, which lets light pass but on so doing scatters it in such a way that it is not possible to clearly distinguish the scene therethrough. A transparent segment 21 here has smooth surfaces, i.e. surfaces having what is called an "optical-polish quality", allowing light beams to be transmitted without significantly modifying their propagation characteristics. A smooth surface preferably has a surface roughness lower than 20 nm RMS (for root mean square) corresponding to the square root of the average of the amplitude of the asperities of the surface, and preferably comprised between 2 nm and 15 nm RMS. The display screen 20, by virtue of its transparent sections 21, thus differs from translucent screens, such as the screen of aforementioned document U.S. Pat. No. 3,551,043, which transmits light originating from the scene but on so doing scatters it in such a way that the objects of the scene are not distinguishable or clearly visible.

The semi-reflective structure 30 is suitable on the one hand for transmitting the beams propagating in the direction of the display screen 20, in particular the beams coming from the projector 10 and the beams coming from the scene, and on the other hand for reflecting the beams coming from the display screen 20.

It has a first face, termed the transmission face 30*t*, which is turned toward the scene and here oriented toward the steering structure 13, and a second face, termed the reflection face 30*r*, which is opposite to the first face 30*t* and oriented toward the display screen 20. Thus, the beams incident on its transmission face 30*t* are partially and preferably completely transmitted, and the beams incident on its reflection face 30*r* are partially and preferably completely reflected.

The semi-reflective structure 30 is placed on the optical path running from the projector 10 to the display screen 20, and between the scene to be observed and the display screen 20. It is here substantially parallel to the display screen 20 but may make a nonzero angle of inclination to the latter. It is here formed of a single semi-reflective plate, but may be replaced by an interference filter performing the same optical function as the semi-reflective plate.

In operation, the image source 11 of the projector 10 delivers an image, termed the source image, which is projected by the optical system 12 onto the display screen 20. More precisely, the light beams emitted by the image source 11 are projected by the optical system 12, and reflected by the steering structure 13 then transmitted by the semi-reflective structure 30 in the direction of the display screen 20. Since the screen is placed in the image plane of the projecting optical system 12, a real image of the image source is then formed on the display screen 20 via its scattering segments 22. The semi-reflective structure 30 then forms a virtual image of the displayed real image. More precisely, the beams coming from the displayed real image are reflected by the semi-reflective structure 30 in the direction of the display screen 20, and transmitted by the latter via its transparent segments 21. In addition, the light beams emitted by the scene are transmitted by the steering structure 13, the semi-reflective structure 30 then the display screen 20, in the direction of an observer placed facing the external face 20*e* of the display screen 20.

Thus, such an observer is able to perceive a virtual image, formed by the semi-reflective structure 30, of the real image projected onto the display screen 20. Thus, the virtual image, since it has no need to be formed on a surface of a display screen 20 in order to be observable, as in the aforementioned document U.S. Pat. No. 3,551,043, appears to truly float in superposition on the scene. Moreover, unlike floating-image-forming systems such as that of the aforementioned document US2009/0009862, the forming system 1 according to the invention does not require a semi-reflective pyramidal structure of upside-down orientation to be used, this allowing an improved viewing comfort to be offered to observers. Specifically, the field of view of the observer is not limited or impaired by the base of the upside-down pyramidal structure, nor by mechanical elements for holding the upside-down pyramid.

FIGS. 3A to 3D illustrate examples of display screens 20 according to one embodiment, in which the screen comprises a panel 23, or a film or sheet, made of at least one transparent material, for example made of glass or of plastic, on which are located scattering segments 22 and transparent segments 21.

FIG. 3A illustrates a display screen 20 formed from a panel 23 made of a given transparent material, a first face of which, which is partly coated with scattering segments 22, forms the internal face 20$i$ of the screen. Said segments are formed from a layer 24 one face of which comprises micro- or nano-structures 25 suitable for scattering incident light. The structures 25 may in particular be obtained by lithography or molding.

As a variant, as illustrated in FIG. 3B, the structures 25 may be produced directly in the internal face 20$i$ of the transparent panel 23, and not on a deposited layer 24. Structures 25 may, as a variant or in addition, be formed in the opposite face of the panel 23, which forms the external face 20$e$ of the display screen 20.

As a variant, as illustrated in FIG. 3C, the display screen 20 may be similar to that of FIG. 3A and differ therefrom in that the scattering segments 22 are formed by depositing, for example by screen-printing, a layer 24 made of a transparent material filled with scattering particles 26.

As a variant, as illustrated in FIG. 3D, the display screen 20 may be formed from a panel 23 of integral construction comprising zones made of a transparent first material, thus forming the transparent segments 21, and zones of a second material, formed from a transparent binder filled with scattering particles 26, thus forming the scattering segments 22. The zones containing scattering particles 26 may extend through all or some of the thickness of the panel 23.

Generally, the display screen 20 also comprises transparent segments 21, here formed from zones of the transparent panel 23 the external and internal faces of which are optically smooth, i.e. the surface roughness of which is lower than or equal to 20 nm RMS. The transparent segments 21 are preferably arranged so as to partially or even completely encircle the scattering segments 22 in the plane of the screen.

FIGS. 4A to 4D illustrate examples of a display screen 20 according to another embodiment, in which the scattering segments 22 are furthermore opaque, and preferably reflective, so as to limit the transmission of the light beams coming from the semi-reflective structure and scattered by the scattering segments 22.

To this end, the scattering segments 22 furthermore comprise a layer 27 made of an opaque, and preferably reflective, material, for example a metal such as aluminum or silver. The layer 27, which is here reflective, may thus be a thin layer of a thickness of a few nanometers to a few microns, for example comprised between 10 nm and 10 μm, and preferably comprised between 30 nm and 100 nm.

Figures 4A, 4B, 4C, 4D:
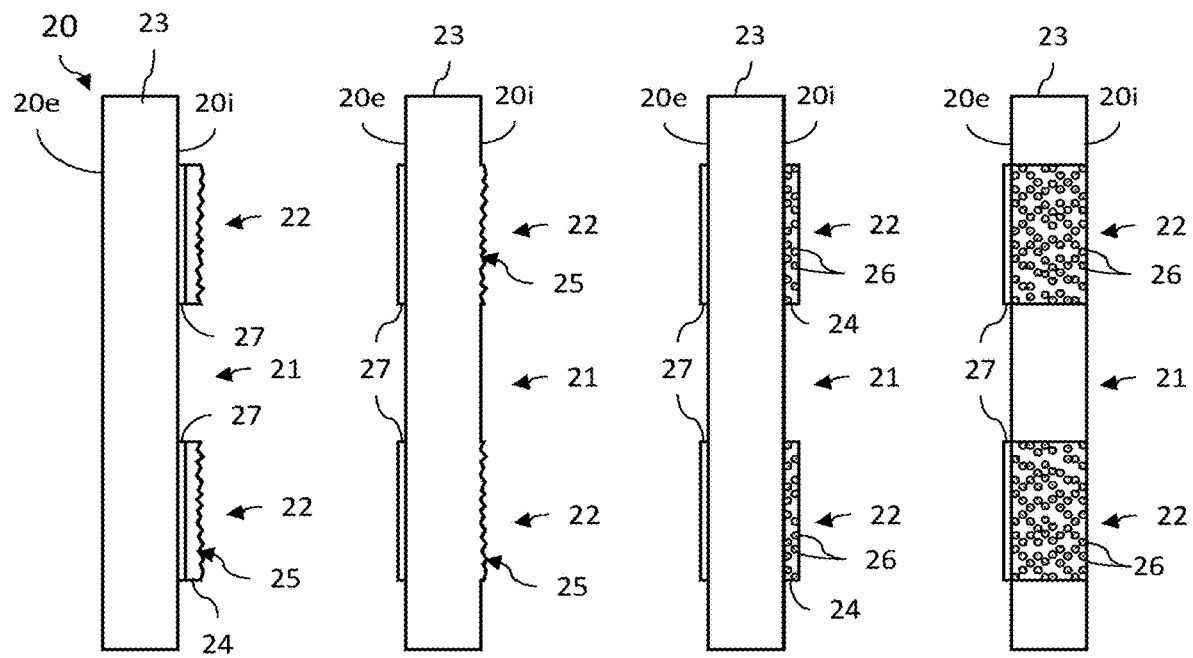
FIGS. 4A to 4D are partial and schematic cross-sectional views of various examples of a display screen comprising transparent segments and scattering and reflective segments.

The thin reflective layers 27 are located level with the scattering segments 22 and not level with the transparent segments 21. Each reflective layer 27 may be located in contact with the internal face 20$i$ of the transparent panel 23, so as to be covered by the structured layer 24 (FIG. 4A). They may as a variant be located in contact with the external face 20$e$, facing the structured layer 24 (not shown); facing the structured zone 22 of the internal face 20$i$ of the transparent panel 23 (FIG. 4B); or facing the layer 24 containing scattering particles 26 (FIG. 4C). They may also make contact with the external face 20$e$ of the panel 23, level with a scattering zone 22 formed by the second material containing the scattering particles 26 (FIG. 4D).

Generally, a display screen 20 the scattering segments 22 of which are also reflective allows the transmission of the light beams of the projected real image toward the observer to be limited, and therefore the light flux in the direction of the semi-reflective structure 30 to be increased. Thus, the optical efficacy of the floating-image-forming system 1 is increased insofar as the floating image is made brighter. In addition, scattering of the projected real image in the direction of the observer is limited. The observation of the floating image through the display screen 20 is thus 'impacted' less by the projected real image, this improving the quality and comfort of viewing of the floating image through a given screen.

Figures 5A, 5B, 5C:
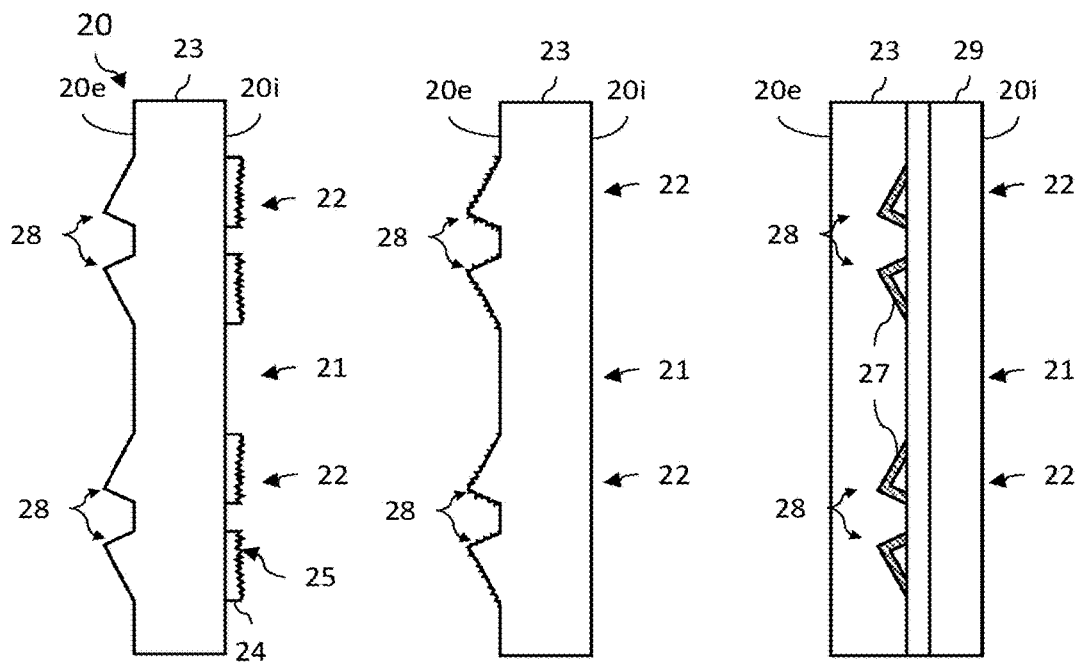
FIGS. 5A to 5C are partial and schematic cross-sectional views of various examples of a display screen comprising transparent segments and scattering and retroreflective segments.

FIGS. 5A to 5C illustrate examples of a display screen 20 according to another embodiment, in which the scattering segments 22 are furthermore retroreflective. The display screen 20 is similar to that of the examples of FIGS. 3A-3D and 4A-4D and differs therefrom essentially in that the scattering segments 22 comprise at least one cube-corner structure 28 so as to ensure a retroreflection of the beams incident on the internal face in the direction of the semi-reflective structure 30.

FIG. 5A illustrates one example in which each scattering segment 22 comprises, on the external face 20$e$ of the display screen 20, cube-corner structures 28. These structures 28 protrude with respect to a plane of the external face 20$e$ of the display screen 20, and form protuberances. Each structure 28 is a protuberance of cube-corner shape, the bases of the protuberances here lying substantially parallel to the external face 20$e$ of the display screen 20. In this example, each scattering segment 22 comprises a scattering layer 24 that is here structured, located on the internal face 20$i$ of the display screen 20 and positioned facing a cube-corner protuberance 28, i.e. plumb with a cube corner 28 through the thickness of the transparent panel 23. To ensure the property of partial transparency of the display screen 20, the cube corners 28 are not adjacent, but are separated from one another by transparent segments 21, which are formed of substantially planar and smooth zones.

FIG. 5B illustrates an example of a display screen 20 that is similar to that in FIG. 5A, and that differs therefrom essentially in that the scattering function of the scattering segments 22 is ensured, not by a deposited scattering layer, but by surface imperfections of the external face 20$e$ level with the cube-corner protuberances 28. These surface imperfections may be obtained, for example, by mechanical surface structuring, lithography or molding.

Moreover, a metal layer (not shown) may also be provided on the external face of the screen, in the scattering and retroreflective segments 22, in order to promote reflection of incident light. Other transparent reflective scattering films may be used, for example holographic films one example of which is given in document U.S. Pat. No. 6,288,805, or even transparent reflective scattering films of the type sold by Luminit as "Light Shaping Diffusers".

FIG. 5C illustrates another example in which each scattering segment 22 comprises a cube-corner structure 28 taking the form of a notch in a transparent panel 23. The surface of the cube-corner notch 28 is advantageously coated with a thin reflective layer 27, for example a metal layer, such as a layer of aluminum or silver of a thickness this is advantageously comprised between 20 nm and 100 nm. The notches are produced in a first panel 23, to which a second transparent panel 29 is fastened by means of a layer of transparent adhesive. Structures 25 may also be provided facing the cube corners 28, on the face 20*i* of the screen 20, in order to reinforce the scattering of the light beams.

The scattering function of the light beams may be insured by the presence of structures 25, as described above, or, as a variant, be ensured by surface imperfections formed by the edges of the cube corners 28.

As a variant to the above-described examples of display screens comprising scattering and retroreflective segments, the retroreflective function may be performed, not by cube-corner structures, but by a layer of a microsphere-based material. As described in document WO 2015/158999, one face of the screen may thus comprise zones coated with a microsphere-based layer, thus forming the retroreflective scattering segments 22, and zones not coated with this layer, thus forming the transparent segments 21.

Generally, the degree of occultation by the scattering segments 22, i.e. the ratio of the cumulative area of the scattering segments 22 to the total area of the internal or external face of the display screen 20, is advantageously lower than or equal to 50% and preferably lower than or equal to 20%, so as to allow a good view of the scene in transparency through the display screen 20. Other values are possible depending on the application.

Such a display screen 20, in which the scattering segments 22 are furthermore retroreflective, allows the optical efficacy of the floating-image-forming system 1 to be further increased. The floating image, observed through the display screen 20 and the semi-reflective structure 30, thus appears brighter.

Figure 6A:
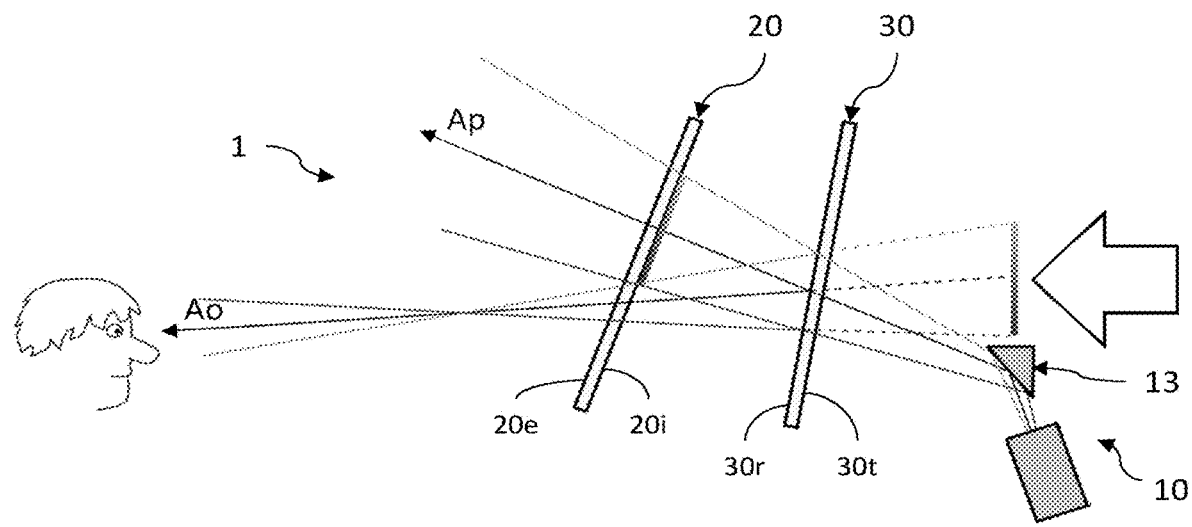
FIGS. 6A and 6B illustrate, partially and schematically, in cross section (FIG. 6A) and in perspective (6B), an image-forming system according to another embodiment, in which the projector comprises a steering mirror.
Figure 6B:
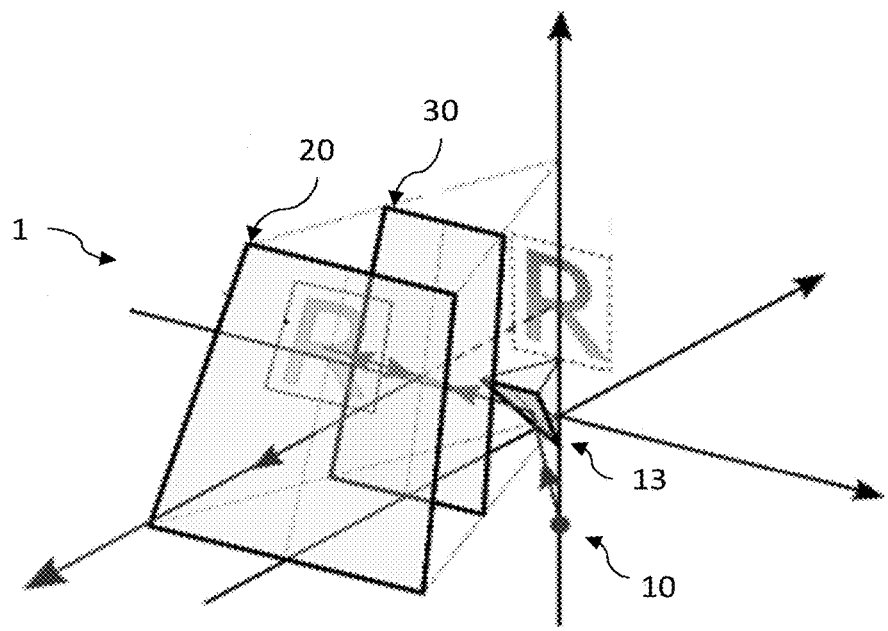

FIGS. 6A and 6B are schematic views, in cross section (FIG. 6A) and in perspective (FIG. 6B), illustrating a system 1 for forming a floating image according to another embodiment, allowing a high luminous efficacy to be obtained.

Here, the steering structure of the projector 10 is a mirror that ensures substantially complete reflection of the light beams emitted by the light source 11 and transmitted by the projecting optical system 12. Thus, the luminous efficacy of the floating-image-forming system 1 is then increased.

The optical axis of projection, corresponding to the axis of propagation of the beams emitted by the projector 10 and transmitted by the semi-reflective structure 30 then by the display screen 20, will here be denoted Ap. Furthermore, the optical axis of observation, corresponding to the optical axis of the beams retroreflected along the axis of projection Ap, then reflected by the semi-reflective structure 30 and lastly transmitted by the display screen 20, will be denoted Ao. The angle $\Delta\theta$ is defined as being the separation between the axis of propagation Ap and the axis of observation Ao.

The various elements of the floating-image-forming system 1 are preferably arranged, i.e. mutually orientated and positioned, so that the axis of projection Ap is distinct from the axis of observation Ao. Thus, an observer is able to observe the floating image in superposition on the scene, without being distracted by light beams coming from the projector 10 and directly transmitted through the transparent segments 21 of the display screen 20. Preferably, the angular separation $\Delta\theta$ between the axis of projection Ap and the axis of observation Ao is larger than or equal to 20°.

Moreover, the various elements of the forming system 1 are mutually arranged so that the floating image is formed in a zone separate from the projector 10, and in particular a zone separate from the steering structure 13. In other words, the elements of the forming system 1 are positioned and oriented with respect to one another so that the floating image is not superposed on the steering structure 13 of the projector 10. The floating image is thus located a distance away from the steering structure 13.

Generally, the floating-image-forming system 1 comprises a casing (not shown) in the interior of which are located the image source 11 and the projecting optical system 12, and which forms a plinth on which the display screen 20 and the semi-reflective structure 30 rest. The casing comprises an aperture level with which the steering structure is located, thus allowing the light beams emitted by the image source 11 to be reflected by the steering structure 13 out of the casing, in the direction of the display screen 20.

Figure 7A:
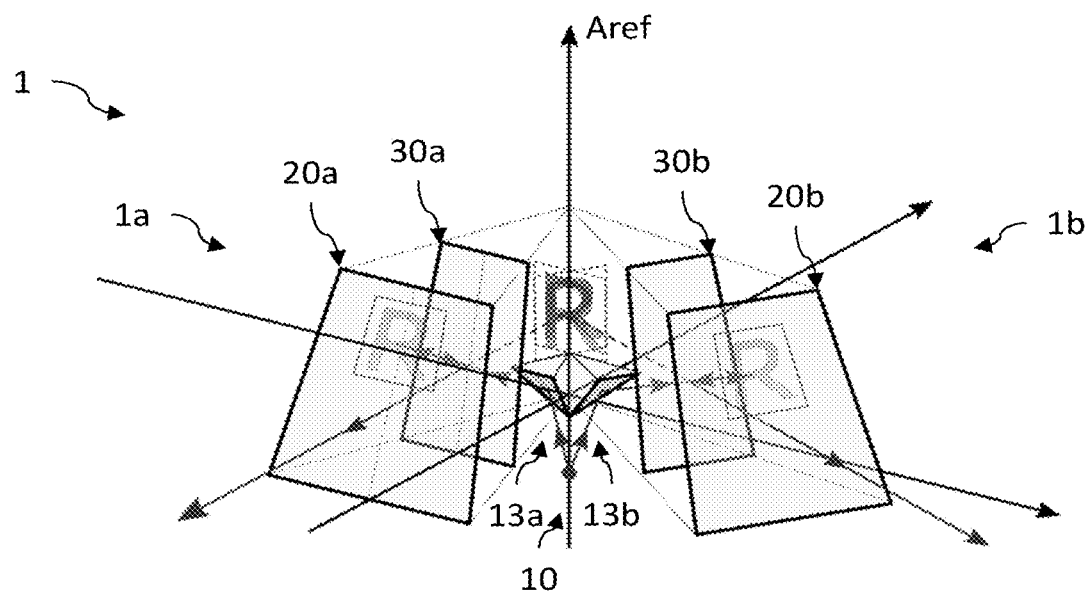
FIGS. 7A, 7B and 7C illustrate, partially and schematically, various examples of an image-forming system according to another embodiment, allowing a quasi-three-dimensional floating image to be formed.
Figure 7B:
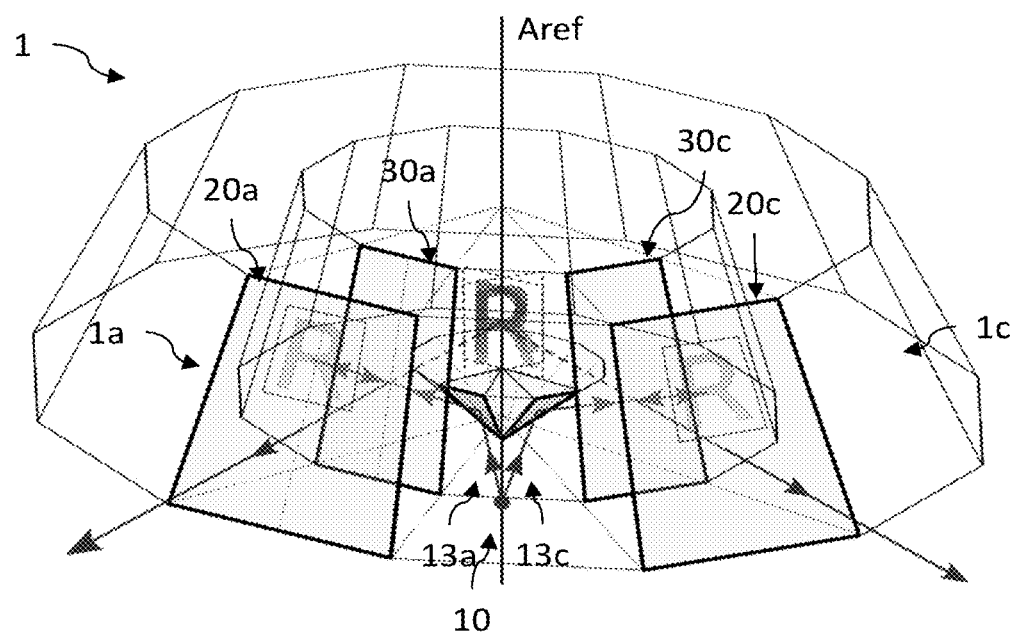

FIG. 7A illustrates a floating-image-forming system 1 according to another embodiment, and FIG. 7B illustrates a variant of the forming system 1 allowing a quasi-three-dimensional floating image to be formed.

With reference to FIG. 7A, the floating-image-forming system 1 here comprises two floating-image-forming devices, termed elementary devices 1*a*, 1*b*, each elementary device being similar or identical to the floating-image-forming system 1 illustrated in FIG. 6B.

The image-forming system 1 thus comprises two display faces 20*a*, 20*b* that are distinct from each other, each of which is associated with one semi-reflective face 30*a*, 30*b* and with one projecting optical system (not shown). The display faces 20*a*, 20*b* are here two distinct display screens. Likewise, the semi-reflective faces 30*a*, 30*b* are distinct semi-reflective structures. The display faces 20*a*, 20*b* and the semi-reflective faces 30*a*, 30*b* are here substantially planar. The display faces 20*a*, 20*b* may make contact with each other, or as illustrated be located a distance away from each other.

The projector 10 here comprises two source images (not shown), delivered by the same image source or two distinct image sources, and at least one, for example two, projecting optical systems (not shown) that each conjugate the delivered source image with one different display face 20*a*, 20*b*. It furthermore comprises a steering prism 13 formed of an upside-down pyramid having two reflective faces 13*a*, 13*b* that are each oriented toward the corresponding display faces 20*a*, 20*b*. The source images may be identical or different from each other. The system 1 may comprise a single projector 10, or even a plurality of projectors 10 that are distinct from one another, each then comprising a single image source.

In operation, each source image is projected by the one or more optical systems onto the display faces 20*a*, 20*b*, which each display a real image of the source image. The displayed real images are scattered, and preferably reflected or even retroreflected, in the direction of the semi-reflective faces 30*a*, 30*b*, so that virtual images of the projected real images are formed by the semi-reflective faces 30*a*, 30*b*. Preferably, the elementary floating-image-forming devices 1*a*, 1*b* are identical to each other and are mutually arranged so as to have plane symmetry in a plane passing through a vertical reference axis Aref. Thus, each virtual image appears at the same distance from the display faces 20*a*, 20*b*, so that an observer passing from one display screen 20 to the next is able to perceive the floating image located in the same position.

FIG. 7B illustrates a variant of a floating-image-forming system 1 that here comprises a plurality of image-forming devices 1*a*, 1*b*, 1*c* . . . allowing a floating image to be formed that is quasi-three-dimensional in the sense that an observer will be able to observe the floating image whatever his position about the forming system 1. In addition, when the source images show the same object from various viewing angles, the observer will be able to observe the same object from these various viewing angles, depending on his position about the forming system 1, this thus reinforcing the three-dimensional aspect of the floating image.

In this example, the display faces 20*a*, 20*b*, 20*c* . . . are faces of one and the same display screen, which is common to the various forming devices 1*a*, 1*b*, . . . said faces being arranged one after the other so as to extend continuously about the same reference axis Aref. In the same way, the semi-reflective faces 30*a*, 30*b*, 30*c* . . . are the faces of one and the same semi-reflective structure, which is common to the various forming devices, said faces being arranged one after the other so as to extend continuously about the same reference axis Aref.

In this example, the display faces 20*a*, 20*b*, 20*c* . . . and the semi-reflective faces 30*a*, 30*b*, 30*c* . . . form substantially planar surfaces. They are here axially symmetric about said reference axis, with a periodicity corresponding to the width of the faces.

The projector 10 comprises a plurality of image sources (not shown) and a plurality of projecting optical systems (not shown) that each conjugate the image source 11 with one of the display faces 20*a*, 20*b*, 20*c* . . . . It furthermore comprises a steering prism 13 formed of an upside-down pyramid having as many reflective faces 13*a*, 13*b*, 13*c* . . . as there are image sources and display faces 20*a*, 20*b*, 20*c* . . . . The image sources may deliver source images that are identical to or different from one another.

The operation is similar to that described with reference to FIG. 7A, given the fact that an observer is able to observe the floating image, positioned at the same distance from the various display faces 20*a*, 20*b*, 20*c* . . . , whatever his position about the floating-image-forming system 1. This optical effect reinforces the impression of observing a three-dimensional or quasi-three-dimensional floating image.

As a variant, as detailed below with reference to FIG. 8C, the projector 10 may comprise a single source of a single image, associated with a scannable steering device. The image source 11 is then preferably a pico-projector of the type referred to in the art by the acronym LBS (for Light Beam Steering), comprising a fixed laser source associated with a movable steering mirror. The mirror is then able to rotate about at least two axes, namely by an angle $\Phi$ about the reference axis, and by an angle of inclination $\theta$ with respect to the reference axis, allowing all of the display faces of the screen to be scanned through 360°.

Figure 7C:
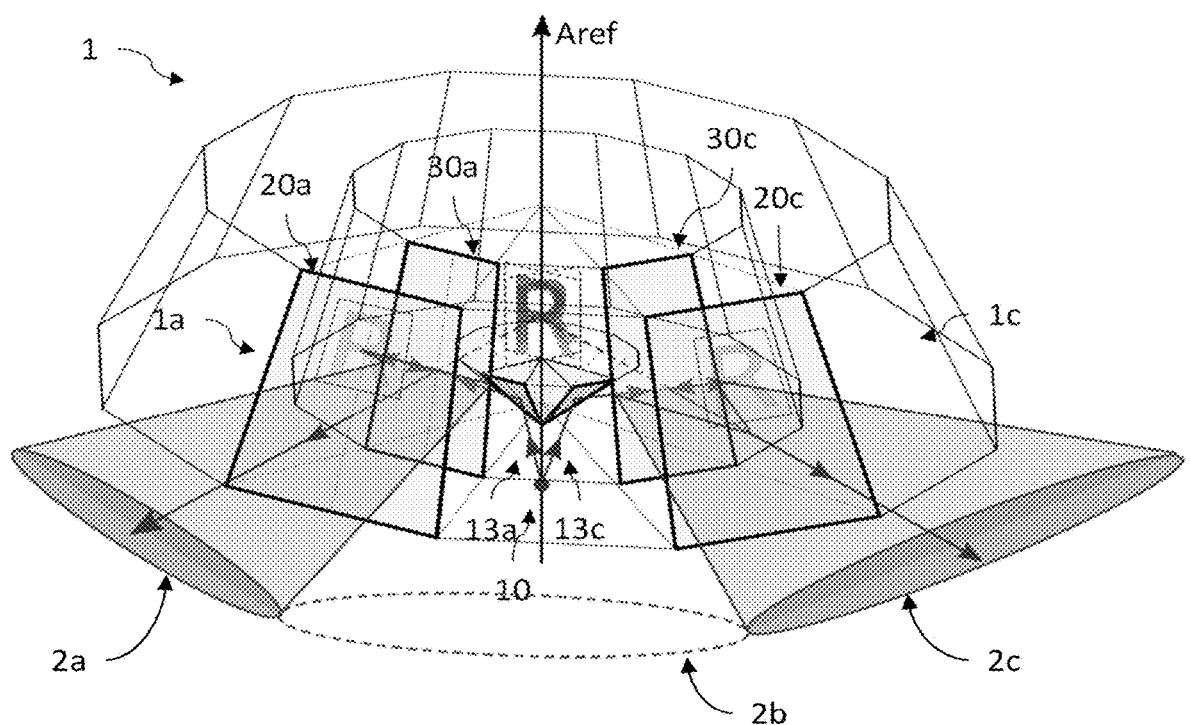

FIG. 7C illustrates a variant of the floating-image-forming system 1 shown in FIG. 7B. In this example, each display face 20*a*, 20*b*, 20*c* is furthermore suitable for scattering the retroreflected light in a scattering cone 2*a*, 2*b*, 2*c*. The angular diameter of each scattering cone 2*a*, 2*b*, 2*c* may be asymmetric, and preferably large in a horizontal plane and small in a vertical plane. This scattering asymmetry allows scattering to be privileged in the plane of rotation of the observer about the reference axis Aref. The scattering and retroreflective segments 22 are advantageously designed so that the scattering cones 2*a*, 2*b*, 2*c* of adjacent display faces 20*a*, 20*b*, 20*c* advantageously overlap partially pairwise, in a horizontal plane orthogonal to the axis Aref. More precisely, the scattering indicatrix associated with a display face 20*a* is advantageously secant with the scattering indicatrix associated with the adjacent display face 20*b*. This allows the three-dimensional aspect of the floating image to be reinforced while preserving the luminous efficacy of the system.

Figure 8A:
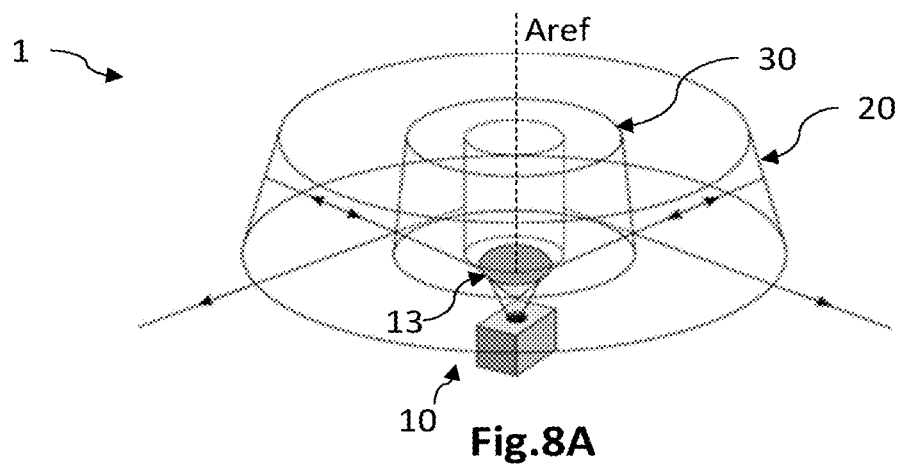
FIGS. 8A and 8B illustrate, partially and schematically, an image-forming system according to another embodiment, the display screen and the semi-reflective structure of which are curved and coaxial.
Figure 8B:
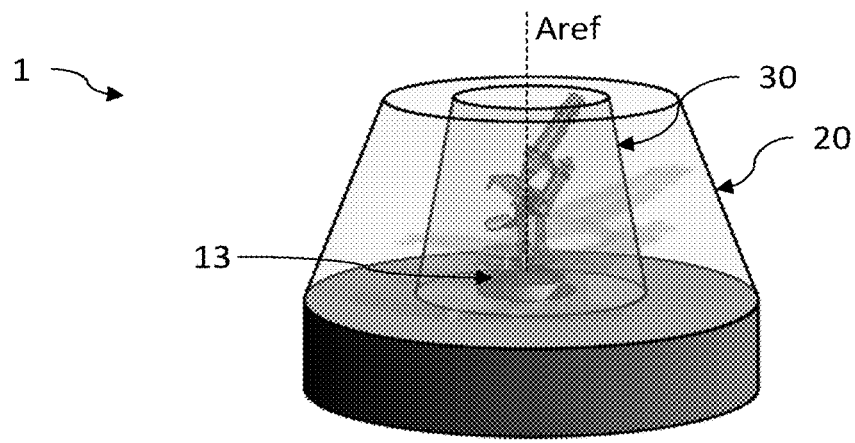

FIGS. 8A and 8B illustrate the same floating-image-forming system 1 according to another embodiment, in which the display screen 20 and the semi-reflective structure 30 are curved and coaxial, allowing the impression of observing a quasi-three-dimensional floating image to be reinforced.

The display screen 20 has a curved display face, and forms a cone of revolution, called the external cone of revolution, about the reference axis Aref. The display face corresponds to the internal face 20*i* or to the external face 20*e* of the display screen 20 (see FIG. 3A and the figures thereafter). The semi-reflective structure 30 has a curved semi-reflective face, and also forms a cone of revolution, called the internal cone of revolution, about the same reference axis Aref. The display screen 20 and the semi-reflective structure 30 thus extend continuously about the same reference axis Aref, and have the same inclination with respect to each other, whatever the angular position about the axis.

The projector 10 comprises an image source (not shown). The delivered image is preferably an anamorphic image, or an anamorphosis, i.e. an image that is deformed in the plane of the emission face of the image source such that the visual meaning of the source image is not recognizable at the emission face, whereas it becomes so when the corresponding floating image is observed.

It furthermore comprises a projecting optical system (not shown), suitable for ensuring the optical conjugation of the image source and of the display screen 20. It lastly comprises a steering structure 13 with a reflective face, or a set of faces, that are axially symmetric about the reference axis. The reflective face 13 is suitable for reflecting the beams transmitted by the projecting optical system in the direction of the display screen 20 through 360°.

In operation, the image source 11 delivers an anamorphic image that is projected by the optical system, and reflected by the conical steering mirror 13, through 360°, onto the conical display screen 20. This screen 20 displays a projected real image of the delivered image, which remains anamorphic. The displayed real image is scattered, and preferably retroreflected, in the direction of the conical semi-reflective structure 30, which then forms a virtual image of the displayed real image. The virtual image therefore appears to float in superposition on the scene, and is observable whatever the position of the observer about the forming display system 1. The floating image then has the visual meaning that was not decipherable from the delivered anamorphic image. Thus, since the displayed real image has no visual meaning, the observer is less distracted thereby if he happens to see it. His attention is then better centered on the floating image.

Figure 8C:
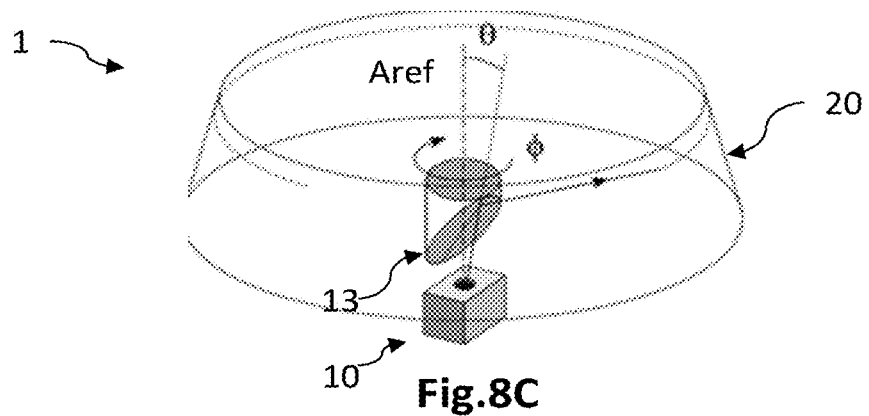
FIG. 8C illustrates, partially and schematically, an image-forming system according to one variant in which the projector is a scannable projecting device.

FIG. 8C illustrates a variant of the floating-image-forming system 1 illustrated in FIGS. 8A and 8B, and differs therefrom essentially in that the projector 10 comprises, not a fixed (i.e. immovable) steering structure but a steering face 13 that is rotatable about the reference axis Aref.

The steering face 13 is here substantially planar and inclined by an angle $\theta$ with respect to the reference axis Aref so as to orient the light beams coming from the image source in the direction of the display screen 20.

Thus the image source delivers an image to be projected, which is optionally anamorphic, and which is projected by the projecting optical system onto the display screen 20 by way of the rotatable steering mirror 13. The rotatable steering mirror 13 turns at an angular velocity $\Phi(t)$ so that the delivered image is projected through 360° onto the display screen 20. The displayed real image is then scattered and preferably retroreflected by the display screen 20 in the direction of the semi-reflective structure 30, which then forms a floating image.

As a variant, the projector 10 may comprise a scannable image-projecting device, for example a miniaturized scannable video projector. The device is positioned so as to illuminate the rotary face of the mirror, so that the beam reflected by the mirror illuminates the display face of the screen. The device for example comprises a movable laser source. By way of example, the device is a pico-projector of the type referred to in the art by the acronym LBS (for Light Beam Steering), comprising a fixed laser source and the movable mirror. The mirror is then able to rotate about at least two axes, by the angle $\Phi$ about the reference axis, and by the angle $\theta$, allowing all of the display face of the screen to be scanned.

Particular embodiments have been described. Various variants and modifications will appear obvious to those skilled in the art.

Thus, the positional and inclinational arrangement of the elements of the image-forming system may be chosen so that the floating image is observed along a substantially horizontal axis or as in a low-angle shot. This allows the inclination of the display screen and of the semi-reflective structure with respect to the reference axis to be decreased.

The invention claimed is:

1. A system for forming a floating image, comprising:
   (a) an image projector configured to project a source image;
   (b) a display screen comprising an internal face configured to display the image projected by the image projector, wherein the display screen comprises (b1) transparent segments configured to transmit light beams incident on the internal face coming from a scene to be observed and (b2) scattering segments configured to scatter light beams incident on the internal face coming from the image projector and to display the image projected by the image projector; and
   (c) a semi-reflective structure, placed between the image projector and the display screen, comprising (c1) a transmission face configured to transmit the light beams coming from the image projected by the image projector and the light beams coming from the scene to be observed, and (c2) an opposite reflection face, configured to reflect light beams coming from the display screen, so as to form the floating image on the display screen, the floating image being observable through the display screen using the semi-reflective structure,
   wherein the transparent segments of the display screen are configured to transmit light beams coming from the semi-reflective structure, and wherein the scattering segments are configured to scatter the light beams coming from the semi-reflective structure in the direction of said semi-reflective structure.

2. The system as claimed in claim 1, wherein the scattering segments of said display screen comprise reflective segments that reflect in the direction of the semi-reflective structure the light beams coming from the semi-reflective structure and scattered by the scattering segments.

3. The system as claimed in claim 1, wherein the scattering segments of the display screen are retroreflective so that the light beams coming from the semi-reflective structure with an axis of incidence with respect to the scattering segments are reflected by the scattering segments in the direction of the semi-reflective structure with an axis of reflection identical to the axis of incidence.

4. The system as claimed in claim 1, wherein the display screen comprises a plurality of display faces that are substantially planar and distinct pairwise, and wherein the semi-reflective structure also comprises a plurality of faces that are substantially planar and inclined pairwise, each being optically associated with one display face.

5. The system as claimed in claim 4, wherein the plurality of display faces extend continuously about a reference axis passing through a steering structure of the image projector, the display screen and the semi-reflective structure each forming a pyramidal cone.

6. The system as claimed in claim 4, wherein the image projector is configured to deliver a plurality of source images, and comprises at least one projecting optical system configured to optically conjugate a source image with a different face of the display screen.

7. The system as claimed in claim 4, wherein the image projector comprises a steering structure having a plurality of reflective steering faces, each of the reflective steering faces being optically associated with a source image and with a display face.

8. The system as claimed in claim 4, wherein the image projector comprises a steering structure having a reflective face that is able to rotate about a reference axis so as to project the source image onto the plurality of display faces of the display screen.

9. The system as claimed in claim 4, wherein the scattering segments of said display faces are:
   retroreflective, so that the light beams coming from the semi-reflective structure with an axis of incidence with respect to the scattering segments are reflected by the scattering segments in the direction of the semi-reflective structure with an axis of reflection identical to the axis of incidence, and
   suitable for scattering configured to scatter the retroreflected light beams in a scattering cone, each scattering cone associated with one display face partially overlapping the scattering cone associated with an adjacent display face.

10. The system as claimed in claim 1, wherein the display screen and the semi-reflective structure each comprise a single substantially curved face.

11. The system as claimed in claim 10, wherein the curved faces extend continuously about a reference axis passing through a steering structure of the image projector, the display screen and the semi-reflective structure each forming a cone of revolution with respect to the reference axis.

12. The system as claimed in claim 10, wherein the source image is an anamorphic image.

13. The system as claimed in claim 1, wherein each scattering segment is encircled by a transparent segment, and wherein the display screen has a degree of occultation by the scattering segments lower than or equal to 20%.

14. The system as claimed in claim 1, wherein the image projector comprises at least one steering structure configured to reflect at least partially the light beams coming from an image source in the direction of the display screen, said semi-reflective structure being placed between the display screen and the steering structure.

15. A system for forming a floating image, comprising:
   (a) an image projector configured to project a source image;
   (b) a display screen comprising an internal face configured to display the image projected by the image projector, wherein the display screen comprises (b1) transparent segments configured to transmit light beams incident on the internal face coming from a scene to be observed and (b2) scattering segments configured to scatter light beams incident on the internal face coming from the image projector and to display the image projected by the image projector; and (c) a semi-reflective structure, placed between the image projector and the display screen, comprising (c1) a transmission face configured to transmit the light beams coming from the image projected by the image projector and the light beams coming from the scene to be observed, and (c2) an opposite, reflection face, configured to reflect light beams coming from the display screen, so as to form the floating image on the display screen, the floating image being observable through the display screen using the semi-reflective structure, wherein the display screen comprises a plurality of display faces that are substantially planar and distinct pairwise, and wherein the semi-reflective structure also comprises a plurality of faces that are substantially planar and inclined pairwise, each being optically associated with one display face.

16. The system as claimed in claim 15, wherein the plurality of display faces extend continuously about a reference axis passing through a steering structure of the image projector, the display screen and the semi-reflective structure each forming a pyramidal cone.

17. The system as claimed in claim 15, wherein the image projector is configured to deliver a plurality of source images, and comprises at least one projecting optical system configured to optically conjugate a source image with a different face of the display screen.

18. The system as claimed in claim 15, wherein the image projector comprises a steering structure having a plurality of reflective steering faces, each of the reflective steering reflective faces being optically associated with a source image and with a display face.

19. The system as claimed in claim 15, wherein the image projector comprises a steering structure having a reflective face that is able to rotate about a reference axis so as to project a source image onto the plurality of display faces of the display screen.

20. A system for forming a floating image, comprising:

(a) an image projector configured to project a source image;

(b) a display screen comprising an internal face configured to display the image projected by the image projector, wherein the display screen comprises (b1) transparent segments configured to transmit light beams incident on the internal face coming from a scene to be observed and (b2) scattering segments configured to scatter light beams incident on the internal face coming from the image projector and to display the image projected by the image projector; and (c) a semi-reflective structure, placed between the image projector and the display screen, comprising (c1) a transmission face configured to transmit the light beams coming from the image projected by the image projector and the light beams coming from the scene to be observed, and (c2) an opposite, reflection face, configured to reflect light beams coming from the display screen, so as to form the floating image on the display screen, the floating image being observable through the display screen using the semi-reflective structure, wherein the display screen and the semi-reflective structure each comprise a single substantially curved face.

* * * * *